(12) United States Patent
    Komori et al.

(10) Patent No.: US 11,814,081 B2
(45) Date of Patent: Nov. 14, 2023

(54) CONTROL SYSTEM, CONTROL METHOD, VEHICLE, AND COMPUTER-READABLE STORAGE MEDIUM

(71) Applicant: HONDA MOTOR CO., LTD., Tokyo (JP)

(72) Inventors: Kenji Komori, Wako (JP); Satoshi Onodera, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 17/144,241

(22) Filed: Jan. 8, 2021

(65) Prior Publication Data

US 2021/0221401 A1      Jul. 22, 2021

(30) Foreign Application Priority Data

Jan. 20, 2020  (JP) .................. 2020-006984

(51) Int. Cl.
    *B60W 60/00*      (2020.01)
    *B60W 30/09*      (2012.01)
    (Continued)

(52) U.S. Cl.
    CPC ........ *B60W 60/0015* (2020.02); *B60W 30/09* (2013.01); *B60W 30/0953* (2013.01); *B60W 30/0956* (2013.01); *B60W 30/16* (2013.01); *G01C 21/3889* (2020.08); *G08G 1/166* (2013.01); *B60W 2420/42* (2013.01);
    (Continued)

(58) Field of Classification Search
    None
    See application file for complete search history.

(56) References Cited

U.S. PATENT DOCUMENTS 10,118,641 B2   11/2018   Fujita
10,215,572 B2   2/2019    Urano et al.
(Continued)

FOREIGN PATENT DOCUMENTS

CN   106996793 A   8/2017
CN   107077791 A   8/2017
(Continued)

OTHER PUBLICATIONS

Chinese Office Action for Chinese Patent Application No. 202110025391.2 dated Jun. 7, 2023.

*Primary Examiner* — Christian Chace
*Assistant Examiner* — Shayne M. Gilbertson
(74) *Attorney, Agent, or Firm* — Thomas | Horstemeyer, LLP

(57) ABSTRACT

A control system of a vehicle, the vehicle including a detection unit for detecting external information related to an outside of surroundings of the vehicle, the external information being used to control a driven state of the vehicle is provided. The control system performs a method comprising: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

17 Claims, 7 Drawing Sheets

(51) Int. Cl.
  *G01C 21/00* (2006.01)
  *B60W 30/095* (2012.01)
  *B60W 30/16* (2020.01)
  *G08G 1/16* (2006.01)

(52) U.S. Cl.
  CPC ... *B60W 2420/52* (2013.01); *B60W 2554/404* (2020.02); *B60W 2554/4026* (2020.02); *B60W 2554/4029* (2020.02); *B60W 2555/00* (2020.02)

(56) References Cited

U.S. PATENT DOCUMENTS

| | | | |
|---|---|---|---|
| 10,414,397 B2 | 9/2019 | Kindo | |
| 10,745,006 B2* | 8/2020 | Grimm | B60W 50/14 |
| 10,890,663 B2 | 1/2021 | Shroff et al. | |
| 11,458,963 B2 | 10/2022 | Takamatsu | |
| 2017/0122749 A1 | 5/2017 | Urano et al. | |
| 2017/0320521 A1* | 11/2017 | Fujita | G01C 21/34 |
| 2018/0290652 A1 | 10/2018 | Kindo | |
| 2019/0294167 A1* | 9/2019 | Kutila | G01C 21/3461 |
| 2020/0003901 A1* | 1/2020 | Shroff | G06T 17/20 |
| 2020/0219197 A1* | 7/2020 | Fields | G06Q 40/08 |
| 2020/0257308 A1* | 8/2020 | Herman | G05D 1/0255 |
| 2020/0298842 A1* | 9/2020 | Takamatsu | B60W 30/09 |
| 2021/0141079 A1* | 5/2021 | Ichinose | G01S 13/931 |
| 2022/0234615 A1* | 7/2022 | Nishino | B60W 60/0011 |

FOREIGN PATENT DOCUMENTS

| | | |
|---|---|---|
| CN | 108688660 A | 10/2018 |
| JP | 2013186724 A | 9/2013 |
| WO | 2019073525 A1 | 4/2019 |
| WO | 2019239775 A1 | 12/2019 |

* cited by examiner

FIG. 6

| | ITEM NAME | VALUE |
|---|---|---|
| ROAD CONSTRUCTION | ONCOMING VEHICLE SIDE POWER POLE | 2 |
| | OWN VEHICLE SIDE POWER POLE | 1 |
| | ROADSIDE MIRROR | 0.5 |
| | STREET GUTTER | 0.5 |
| | GUARDRAIL | 0.5 |
| TRAFFIC ENVIRONMENT | ONCOMING VEHICLE | 1.5 |
| | PARKED VEHICLE | 1 |
| | BICYCLE, PEDESTRIAN | 1 |
| | ABS ACTUATION | 2 |
| | STABILITY CONTROL APPARATUS ACTUATION | 2 |
| NATURAL ENVIRONMENT | RAINFALL (WIPERS IN OPERATION) | 0.5 – 2 (INT, Lo, Hi) |
| | NIGHT-TIME (LIGHTS ON) | 0.5 – 1 (Hi, Lo) |

CONTROL SYSTEM, CONTROL METHOD, VEHICLE, AND COMPUTER-READABLE STORAGE MEDIUM

CROSS-REFERENCE TO RELATED APPLICATION(S)

This application claims priority to and the benefit of Japanese Patent Application No. 2020-006984 filed on Jan. 20, 2020, the entire disclosure of which is incorporated herein by reference.

BACKGROUND OF THE INVENTION

Field of the Invention

The present invention relates to a control system, a control method, a vehicle, and a computer-readable storage medium related to an automated driving vehicle.

Description of the Related Art

In the past years, there have been proposals for technology for automated driving vehicles that performs travel control by determining a travel risk from information related to visibility detected by a detection unit, such as a camera. For example, Japanese Patent Laid-Open No. 2013-186724 discloses a travel technique that sets a target position and a target orientation on a travel route by determining whether there are blind spots on the travel route.

However, for example, when an automated driving vehicle has detected such traffic participants as pedestrians and oncoming vehicles located near the automated driving vehicle on a narrow road, or when the detection performance of a sensor has decreased due to climate conditions, a travel risk of a travel route may be excessively overestimated as a result. In this case, the automated driving vehicle travels based on the erroneously-overestimated travel risk, and thus the automated driving vehicle may not be capable of traveling appropriately on the travel route.

SUMMARY OF THE INVENTION

It is an object of the present invention to provide a technique to travel with appropriate evaluation of a travel risk of a travel route.

According to the present invention, one aspect of the present invention provides a control system of a vehicle, the vehicle including a detection unit for detecting external information related to an outside of surroundings of the vehicle, the external information being used to control a driven state of the vehicle, the control system performs a method comprising: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

Furthermore, according to the present invention, one aspect of the present invention provides a control method for a control system of a vehicle including a detection unit for detecting external information related to an outside of surroundings of the vehicle, the external information being used to control a driven state of the vehicle, the control method comprising: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

Furthermore, according to the present invention, one aspect of the present invention provides a vehicle including a detection unit for detecting external information related to an outside of surroundings of the vehicle, the external information being used to control a driven state of the vehicle, the vehicle performs a control method comprising: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

Furthermore, according to the present invention, one aspect of the present invention provides a computer-readable storage medium having stored therein a program for causing a computer to execute the following, the computer being included in a control system of a vehicle including a detection unit that detects external information related to an outside of surroundings of the vehicle, the external information being used to control a driven state of the vehicle: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

BRIEF DESCRIPTION OF THE DRAWINGS

FIG. 6 is a diagram showing examples of items that affect the travel risk according to the present embodiment.

DESCRIPTION OF THE EMBODIMENTS

Figure 1:
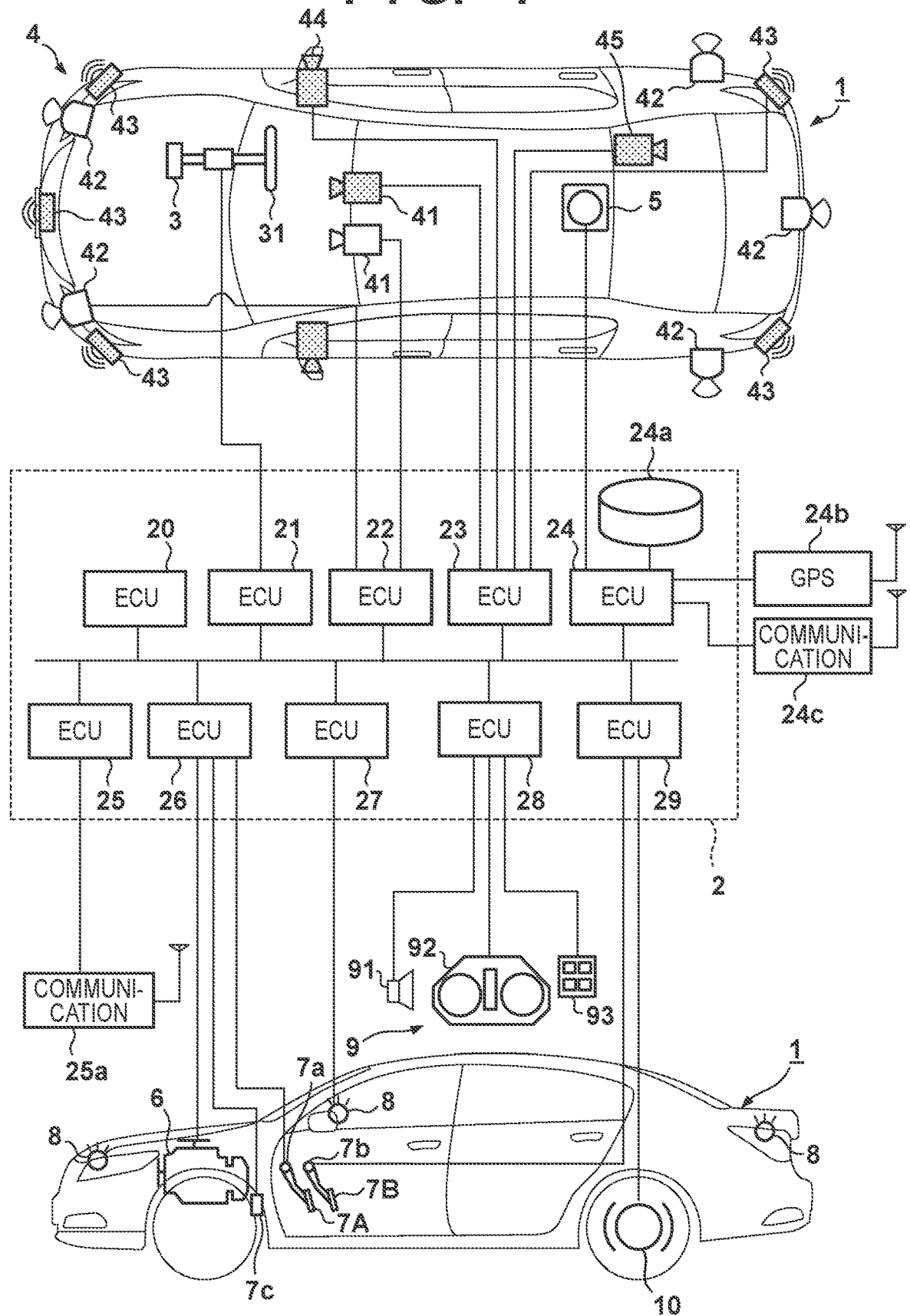
FIG. 1 is a hardware block diagram of a vehicle according to the present embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment (Hardware Configuration)

FIG. 1 is a block diagram of a control apparatus for a vehicle according to an embodiment of the present invention, which controls a vehicle 1. In FIG. 1, the vehicle 1 is schematically shown in a plan view and a side view. As one example, the vehicle 1 is a sedan-type, four-wheeled passenger vehicle.

The control apparatus of FIG. 1 includes a control unit 2. The control unit 2 includes a plurality of ECUs 20 to 29 that are connected in a communication-enabled manner via an in-vehicle network. Each ECU includes a processor which is typically a CPU, a storage device such as a semiconductor memory, an interface for an external device, and the like. The storage device stores a program executed by the processor, data that is used by the processor in processing, and the like. Each ECU may be, for example, a computer provided with a plurality of processors, storage devices, interfaces, and the like.

The following describes the functions and the like handled by respective ECUs 20 to 29. Note that the number of the ECUs and the functions handled by the ECUs can be designed as appropriate, and the ECUs can be segmentalized or integrated compared to the present embodiment.

The ECU 20 executes control related to automated driving of the vehicle 1. In automated driving, at least one of steering and acceleration/deceleration of the vehicle 1 is subject to automated control. In a later-described example of control, both of steering and acceleration/deceleration are subject to automated control.

The ECU 21 controls an electronic power steering apparatus 3. The electronic power steering apparatus 3 includes a mechanism for steering front wheels in accordance with a driving operation (steering operation) that is performed by a driver with respect to a steering wheel 31. The electronic power steering apparatus 3 also includes, for example, a motor that exerts a driving force for assisting a steering operation or performing automated steering of the front wheels, and a sensor that detects a steering angle. When a driving state of the vehicle 1 is automated driving, the ECU 21 performs automated control of the electronic power steering apparatus 3 in accordance with an instruction from the ECU 20, and controls the traveling direction of the vehicle 1.

The ECUs 22 and 23 control detection units 41 to 43 that detect the statuses of the surroundings of the vehicle, and perform information processing with respect to the results of the detection. The detection units 41 are cameras that capture the front of the vehicle 1 (hereinafter may be referred to as front cameras 41); in the case of the present embodiment, they are attached to a front portion of a roof of the vehicle 1 on the vehicle interior side of a windshield. By analyzing images captured by the front cameras 41, the outline of a target and partition lines (e.g., white lines) of vehicle lanes on a road can be extracted.

The detection units 42 use Light Detection and Ranging (LIDAR, hereinafter may be referred to as LIDAR 42) to detect a target around the vehicle 1 and measure a distance to the target. In the case of the present embodiment, five LIDARs 42 are provided: one in each corner of a front portion of the vehicle 1, one in the center of a rear portion of the vehicle 1, and one on each side of the rear portion of the vehicle 1. The detection units 43 are millimeter wave radars (hereinafter may be referred to as radars 43), and detect a target around the vehicle 1 and measure a distance to the target. In the case of the present embodiment, five radars 43 are provided: one in the center of the front portion of the vehicle 1, one in each corner of the front portion of the vehicle 1, and one in each corner of the rear portion of the vehicle 1.

The ECU 22 controls one of the front cameras 41 and each LIDAR 42, and performs information processing with respect to the results of detection performed thereby. The ECU 23 controls the other front camera 41 and each radar 43, and performs information processing with respect to the results of detection performed thereby. Providing two sets of apparatuses that detect the statuses of the surroundings of the vehicle can improve the reliability of the detection results, and furthermore, providing different types of detection units, such as cameras, LIDARs, and radars, enables multifaceted analysis on the surrounding environment of the vehicle. The ECU 23 also controls side cameras 44 and a rear camera 45, and performs information processing with respect to the results of detection performed thereby.

The ECU 24 controls a gyroscope 5, a GPS sensor 24b, and a communication apparatus 24c, and performs information processing with respect to the results of detection or communication performed thereby. The gyroscope 5 detects a rotary motion of the vehicle 1. The course of the vehicle 1 can be determined from, for example, the result of detection performed by the gyroscope 5 and the speed of vehicle wheels. The GPS sensor 24b detects the current position of the vehicle 1. The communication apparatus 24c performs wireless communication with a server that provides map information and traffic information, and obtains these pieces of information. The ECU 24 can access a database 24a of map information, which is constructed in the storage device; for example, the ECU 24 searches for a route from the current location to the destination.

The ECU 25 includes a communication apparatus 25a for inter-vehicle communication. The communication apparatus 25a performs wireless communication with another vehicle there around, and exchanges information between vehicles.

The ECU 26 controls a power plant 6. The power plant 6 is a mechanism for outputting a driving force that causes drive wheels of the vehicle 1 to rotate, and includes, for example, an engine and a transmission. The ECU 26, for example, controls the output of the engine in accordance with a driving operation of the driver detected by an operation detection sensor 7a provided for a gas pedal 7A (a gas pedal operation or an acceleration operation), and switches among gear ratios of the transmission based on information of, for example, the vehicle speed detected by a vehicle speed sensor 7c. When a driving state of the vehicle 1 is automated driving, the ECU 26 performs automated control of the power plant 6 in accordance with an instruction from the ECU 20, and controls acceleration/deceleration of the vehicle 1.

The ECU 27 controls lighting devices (headlights, tail lights, and so forth), including direction indicators 8 (blinkers). In the case of the example of FIG. 1, the direction indicators 8 are provided on the front portion, side-view mirrors, and the rear portion of the vehicle 1.

The ECU 28 controls an input/output apparatus 9. The input/output apparatus 9 outputs information for the driver, and accepts information input from the driver. An audio output apparatus 91 notifies the driver of information by way of sound. A display apparatus 92 notifies the driver of information by displaying images. The display apparatus 92 is installed, for example, in front of a driver's seat, and constitutes an instrument panel and the like. Note that although the foregoing has mentioned audio and display as an example, notification of information may be given by way of vibration and light. Also, notification of information may be given using a combination of two or more of audio, display, vibration, and light. Furthermore, the combination and the mode of notification may vary depending on the level (e.g., urgency) of notification of information to be given.

An input apparatus 93 is a group of switches which is installed in a position where it can be operated by the driver and which issues instructions to the vehicle 1, and may also include an audio input apparatus.

The ECU 29 controls brake apparatuses 10 and a parking brake (not shown). The brake apparatuses 10 are, for example, disk brake apparatuses, are respectively mounted on the wheels of the vehicle 1, and cause the vehicle 1 to decelerate or stop by applying resistance to the rotation of the wheels. The ECU 29, for example, controls the actuation of the brake apparatus 10 in accordance with a driving operation of the driver detected by an operation detection sensor 7b provided for a brake pedal 7B (a brake pedal operation). When a driving state of the vehicle 1 is automated driving, the ECU 29 performs automated control of the brake apparatuses 10 in accordance with an instruction from the ECU 20, and controls deceleration and stopping of the vehicle 1. The brake apparatuses 10 and the parking brake can also be actuated so as to maintain a stopped state of the vehicle 1. Furthermore, when the transmission of the power plant 6 includes a parking lock mechanism, this can also be actuated so as to maintain a stopped state of the vehicle 1.

(Software Configuration)

Figure 2:
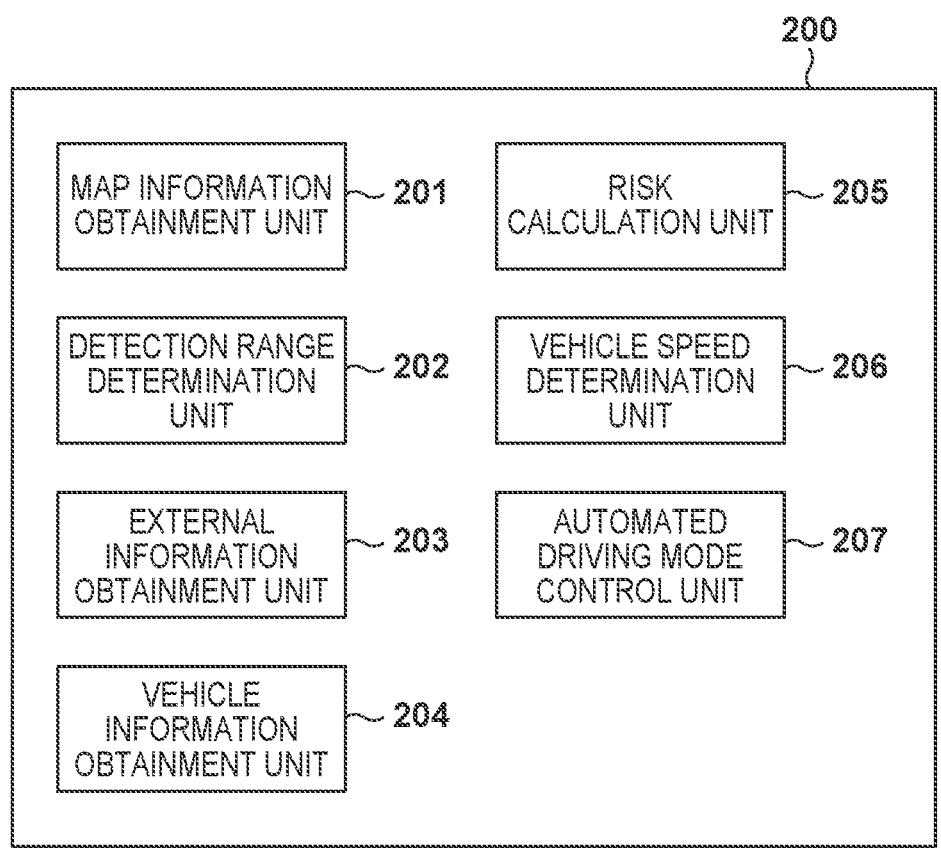
FIG. 2 is a software block diagram of the vehicle according to the present embodiment.

Next, a software configuration of a control system included in the vehicle 1 according to the present embodiment will be described with reference to FIG. 2. A control system 200 of FIG. 2 is realized by at least one of the ECUs 20 to 29 shown in FIG. 1. The control system 200 includes a map information obtainment unit 201, a detection range determination unit 202, an external information obtainment unit 203, a vehicle information obtainment unit 204, a risk calculation unit 205, a vehicle speed determination unit 206, and an automated driving mode control unit 207.

The map information obtainment unit 201 obtains map information from the map information database 24a. In one example, the map information obtainment unit 201 may obtain the map information from another apparatus (not shown) in the network via the communication apparatus 24c. In the present embodiment, it is assumed that the map information includes information related to a travel route associated with position information, such as a road width, an inclination, and a curvature, as well as detection range information corresponding to a range that can be detected by the vehicle at that position. For example, the detection range information may include at least one of information related to a detection range of the external information obtainment unit 203 and information related to a sight distance prescribed by the Order on Road Construction. In this case, the detection range information may be information related to a sight distance associated with a traveling direction on a road. The present embodiment will be described under the assumption that the detection range information is information related to a distance indicating how far ahead the external information obtainment unit 203 can detect a road surface from the position that is currently traveled. In one example, the detection range information may be an angle of a road surface which can be detected by the external information obtainment unit 203 and which is a predetermined distance away from the position that is currently traveled. Note that in a case where the vehicle 1 travels in accordance with a navigation system, the map information obtainment unit 201 may obtain map information around a scheduled travel route.

In one example, the detection range information may be detection ranges that respectively correspond to the types of the external information obtainment unit 203. In this case, the map information may include, for example, information related to a distance of a road surface that can be detected by the cameras and information related to a distance of a road surface that can be detected by the millimeter wave radars, which are each associated with position information. Note that the detection range information may be associated not only with a position, but also with at least one of the type of the vehicle 1, the direction in which the vehicle 1 is traveling, the height at which the external information obtainment unit 203 is installed, and the vehicle height.

The detection range determination unit 202 determines detection range information corresponding to position information obtained by the GPS sensor 24b from among pieces of detection range information included in the map information obtained by the map information obtainment unit 201, thereby obtaining a detection range of the vehicle 1 at that position. That is to say, when detection range information is included as is in the map information, the detection range determination unit 202 may extract this detection range information. In this way, the vehicle 1 can obtain the detection range information at high speed. Also, when the map information includes a plurality of different pieces of detection range information for different types of the external information obtainment unit 203, the detection range determination unit 202 may extract detection range information based on position information and the type of the external information obtainment unit 203 included in the vehicle 1. Furthermore, when the map information includes information of a road width, an inclination, a curvature, and the like, the detection range determination unit 202 may obtain detection range information by calculating a detection range based on such information. By specifying detection range information based on the map information, detection range information of a travel that is scheduled in the future, which cannot be detected by the external information obtainment unit 203, can be obtained. In this way, the vehicle 1 that is scheduled to turn right or turn left at an intersection can specify detection range information after the right turn or the left turn, and as a detection range is expected to decrease after the right turn or the left turn, control can be performed to, for example, reduce the traveling speed before the right turn or the left turn. In another example, when detection range information is included as is in the map information, the detection range determination unit 202 may extract this detection range information and make a correction based on external information obtained from the external information obtainment unit 203. Also, when the map information includes detection range information and the detection range information is information that is associated not only with the position of the vehicle 1 but also with the type of the external information obtainment unit 203, the detection range determination unit 202 can obtain the detection range information in accordance with the type of the external information obtainment unit 203 included in the vehicle 1.

Furthermore, when the map information includes detection range information and the detection range information is information that is associated not only with the position of the vehicle 1 but also with the traveling direction of the vehicle 1, the detection range determination unit 202 can obtain the detection range information in accordance with the traveling direction of the vehicle 1.

The external information obtainment unit 203 is a sensor that includes at least one of a camera, LIDAR, a millimeter wave radar, and a centimeter wave radar. The present embodiment will be described under the assumption that external information is information related to an object that has been detected by applying a known image analysis technique to images captured by the front cameras. In one example, the external information obtainment unit 203 can detect at least one of road structures including power poles, roadside mirrors, street gutters, roadside trees, and guardrails, and traffic participants including oncoming vehicles, vehicles that are traveling alongside, parked vehicles, bicycles, and pedestrians. Also, in one example, the external information obtainment unit 203 may detect weather information and temperature in addition to the road structures and the traffic participants. Furthermore, it is sufficient that external information be pieces of data obtained from sensors including at least one of a camera, LIDAR a millimeter wave radar, and a centimeter wave radar or a combination of such pieces of data, and the external information may further include information related to at least one of, for example, the position, brightness, and depth of an object.

The vehicle information obtainment unit 204 obtains vehicle information related to a vehicle state, such as an automated driving mode and a vehicle speed of the vehicle 1. In one example, the vehicle information includes, for instance, information indicating one of automated driving modes prescribed by the National Highway Traffic Safety Administration (NHTSA) of the United States in which the vehicle 1 is traveling. Also, the vehicle information may include information indicating whether at least one of an Anti-Lock Brake System (ABS), a stability control apparatus, brakes, blinkers, wipers, and headlights of the vehicle 1 has been actuated. Furthermore, the vehicle information may include information indicating that the vehicle is performing at least one of a parking operation and lane changing.

The risk calculation unit 205 calculates a travel risk related to traveling based at least on a detection range determined by the detection range determination unit 202. The calculation of the travel risk will be described later with reference to FIG. 5.

The vehicle speed determination unit 206 determines a traveling speed of the vehicle 1 based on the travel risk calculated by the risk calculation unit 205. The automated driving mode control unit 207 issues an instruction for transition of an automated driving mode of the vehicle 1 based on the travel risk calculated by the risk calculation unit 205. The details of the vehicle speed determination unit 206 and the automated driving mode control unit 207 will be described later with reference to FIG. 4 and FIG. 7.

Figure 3A:
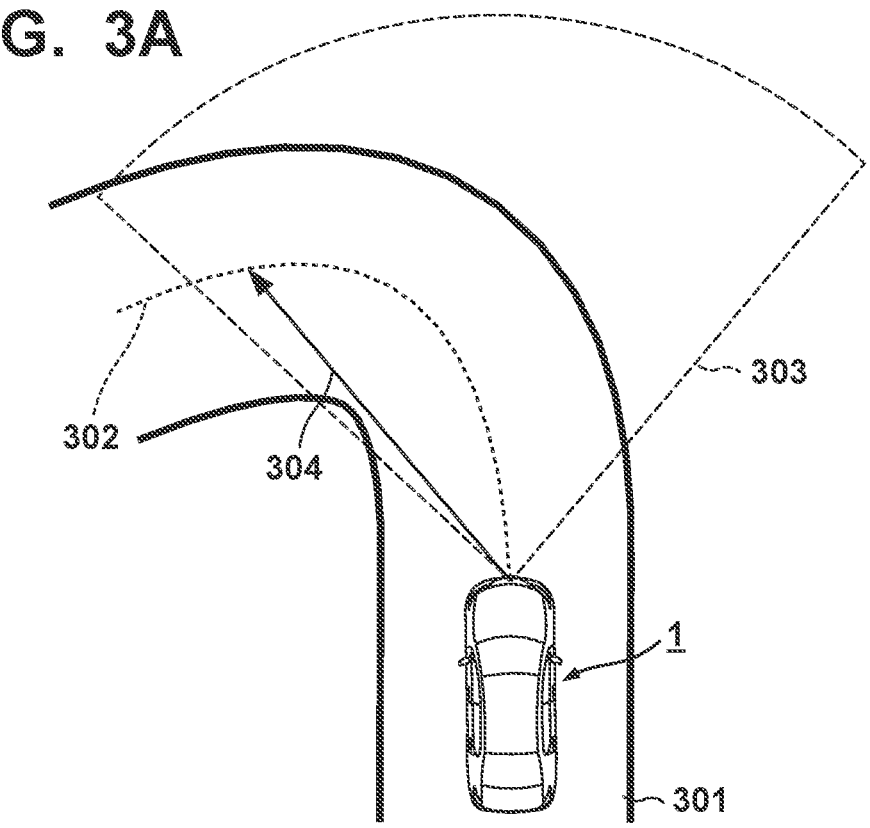
FIGS. 3A and 3B are diagrams showing examples of a detection range of the vehicle according to the present embodiment.
Figure 3B:
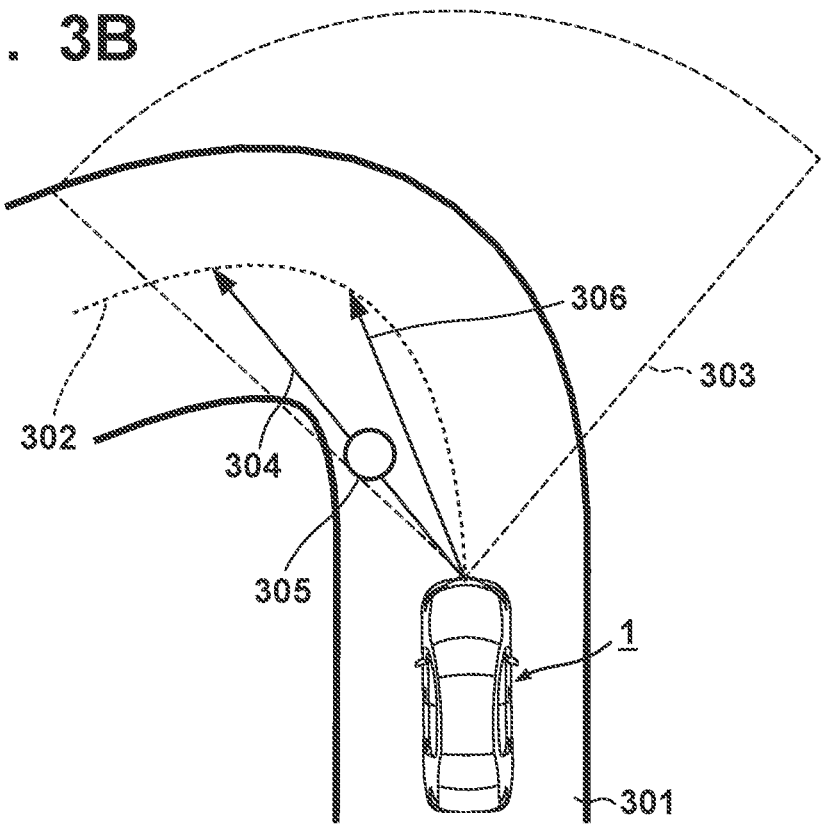

Next, a description is given of one example of a detection range of the vehicle 1 according to the present embodiment with reference to FIGS. 3A and 3B. FIG. 3A and FIG. 3B are bird's-eye views showing a status in which the vehicle 1 travels on a road 301.

It is assumed that, in FIG. 3A, the vehicle 1 can obtain external information of the inside of a range 303, at a maximum, with use of the external information obtainment unit 203. A dot-line arrow 302 indicates a route on which the vehicle 1 is scheduled to travel. A travel route that can be detected by the external information obtainment unit 203 has a maximum distance indicated by an arrow 304. Therefore, the detection range determination unit 202 determines the length of the arrow 304 as a detection range. In one example, the detection range determination unit 202 may determine the length of a scheduled travel route (arrow 302) from the vehicle 1 to the point indicated by the arrow 304 as a detection range. The vehicle 1 determines a detection range from information related to the road 301 obtained by the map information obtainment unit 201.

Note that in one example, the detection range determination unit 202 may determine which one of a plurality of levels corresponds to the distance that can be detected. For example, 30, 20, 10, and 5 may be set as detection range information respectively when a distance of 30 m or longer can be detected, when a distance equal to or longer than 20 m and shorter than 30 m can be detected, when a distance equal to or longer than 10 m and shorter than 20 m can be detected, and when a distance shorter than 10 m can be detected. In this way, the map information can include detection range information indicating that a predetermined range of a travel route corresponds to a predetermined detection range, and the data amount of the map information can be reduced.

Next, it is assumed that, in FIG. 3B, the vehicle 1 can recognize the range 303, at a maximum, with use of the external information obtainment unit 203 and travels on a route along the dot-line arrow 302, similarly to FIG. 3A, but a traffic participant 305 exists on the road 301. Here, the traffic participant 305 is inside a detection range and thus detected by the external information obtainment unit 203. In this case, if the determination is made assuming that the length of a travel route that can be recognized by the external information obtainment unit 203 is the length of an arrow 306 or a scheduled travel route (arrow 302) until the point indicated by the arrow 306, a deviation from the actual travel risk may arise, and it may not be possible to travel at a vehicle speed or in an automated driving mode that is appropriate for the route. In view of this, the vehicle 1 according to the present embodiment determines a travel risk using, as a base, detection range information that has been determined by the detection range determination unit 202 from the map information while taking into account external information detected by the external information obtainment unit 203; this enables traveling at a vehicle speed or in an automated driving mode that it appropriate for the route.

Figure 4:
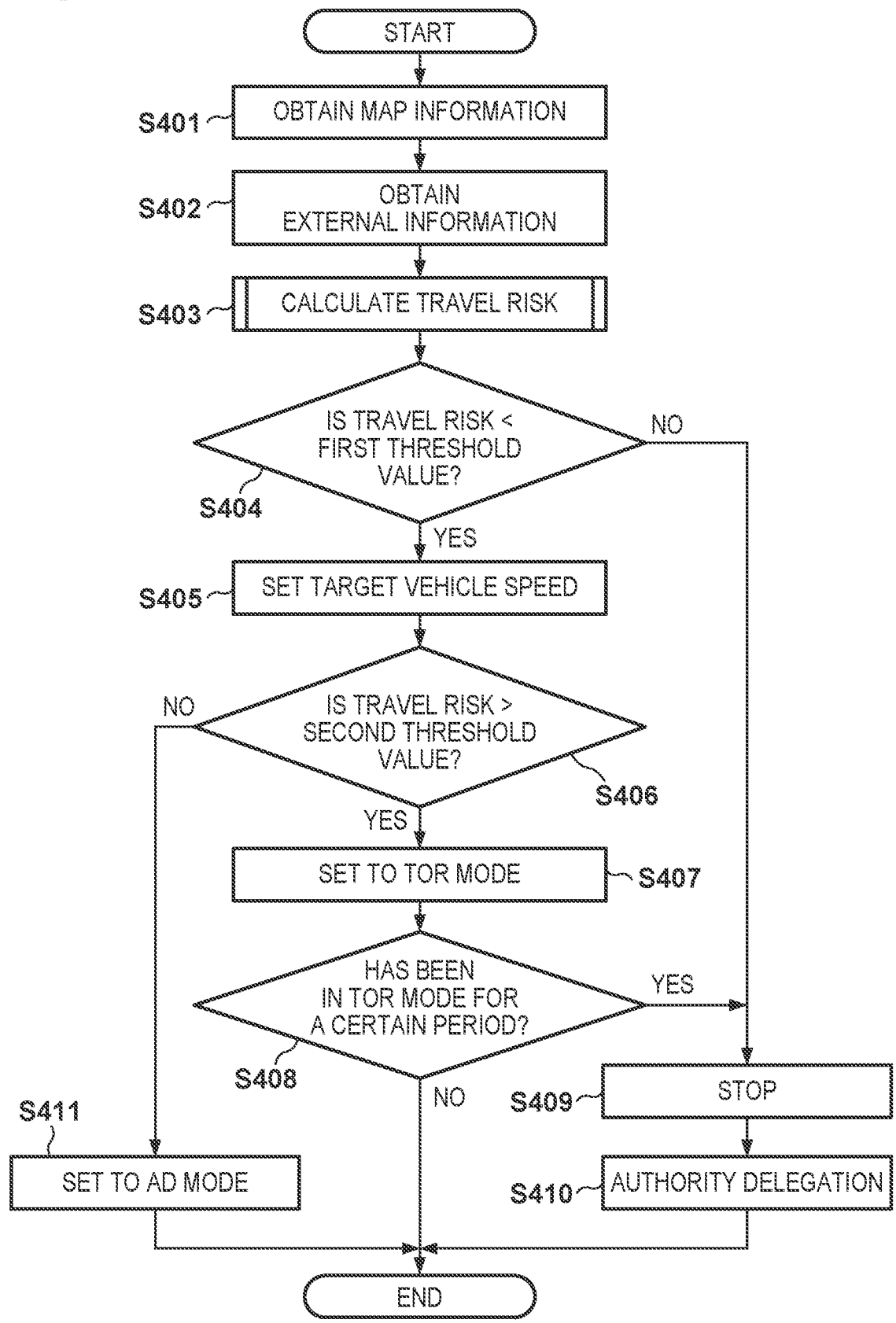
FIG. 4 is a processing sequence diagram showing one example of processing executed by the vehicle according to the present embodiment.

FIG. 4 shows one example of processing executed by the control system 200 according to the present embodiment. The processing of FIG. 4 is executed at a predetermined timing while the vehicle 1 is traveling. First, in step S401, the map information obtainment unit 201 obtains map information. The map information is obtained based on position information of the current location obtained by the GPS sensor 24b. In one example, the map information may be obtained further based on the traveling direction of the vehicle 1.

Next, the control system 200 proceeds to step S402 in the processing, and obtains external information via the external information obtainment unit 203. Next, in step S403, the control system 200 calculates a travel risk based on the map information obtained in step S401 and the external information obtained in step S402.

Figure 5A:
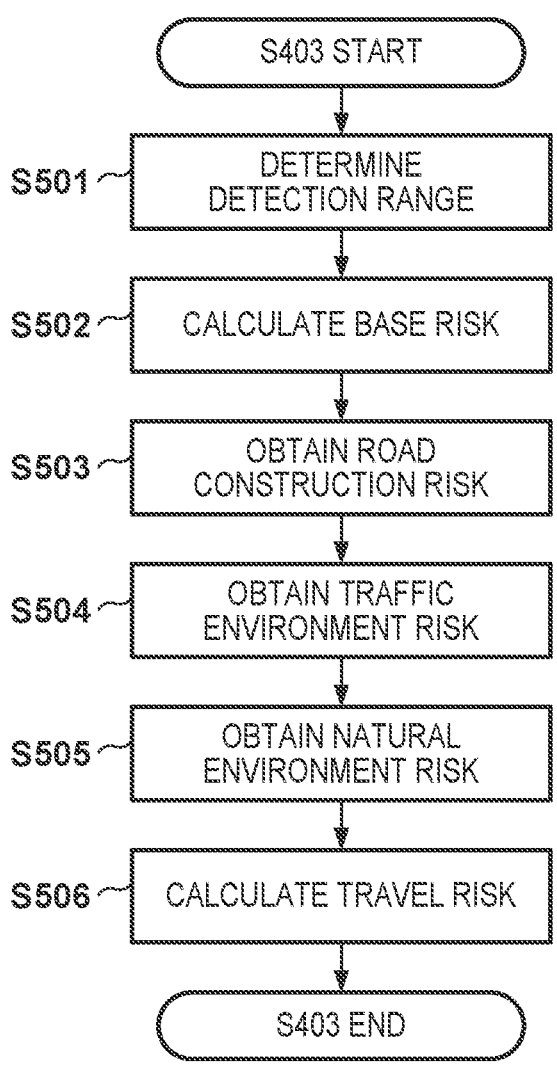
FIGS. 5A and 5B are diagrams showing examples of processing for calculating a travel risk, which is executed by the vehicle according to the present embodiment.

A description is now given of the details of step S403 with reference to FIG. 5A. First, in step S501, the detection range determination unit 202 determines a detection range based on the map information obtained in step S401. As stated earlier, information related to a detection range included in the map information may be obtained, or a detection range may be calculated based on information of a curvature, an inclination, a road width, and the like included in the map information.

Next, in step S502, the risk calculation unit 205 calculates a base risk based on the detection range and the traveling speed of the vehicle 1. For example, provided that the traveling speed is VSP and the detection range is VDI, the base risk PRP can be calculated as follows.

$$PRP=K(VSP/VDI)$$

Here, K is a reference tuning gain, and can be set in advance based on, for example, the brake performance, acceleration capability, and steering performance of the vehicle 1.

Next, the control system 200 proceeds to step S503 in the processing, and calculates risks based on information related to road structures detected by the external information obtainment unit 203. Next, in step S504, the control system 200 calculates risks based on a traffic environment, such as traffic participants, detected by the external information obtainment unit 203. Next, in step S505, the control system 200 calculates risks based on a natural environment detected by the external information obtainment unit 203. Rainy weather, cloudy weather, fog, snowfall, yellow sand, and airborne substances attributed to strong wind are detected; the natural environment includes at least one of a status in which the detection performance of at least one sensor, such as a front camera, is expected to decrease, a status in which a road surface is frozen, and a status in which it is currently night-time. The natural environment also includes a status in which a light source exists in front of at least one of the front cameras 41, side cameras 44, and rear camera 45, that is to say, a status of contre-jour. In this case, too, the detection performance is expected to decrease due to the occurrence of blown-out highlights, flares, and ghosts in images or videos obtained by the cameras.

Note that information obtained by the vehicle information obtainment unit 204 may be used in obtaining the external information. For example, when the vehicle information obtainment unit 204 has obtained information indicating that the wipers have been actuated, rainfall or snowfall can be detected.

Next, in step S506, the control system 200 calculates a travel risk by correcting the base risk based on the road structure risks, the traffic environment risks, and the natural environment risks. For example, provided that a weighted average of the road structure risks is L, a weighted average of the traffic environment risks is T, and a weighted average of the natural environment risks is N, the following may be used.

$$PRP=(K+C)(VSP/VDI)$$

$$C=\text{cbrt}(L \times T \times N)$$

cbrt( ) is a function for yielding a cube root. Note that processing of step S502 may be omitted. That is to say, the travel risk may be calculated in step S506 using the detection range VDI obtained in step S501 and the road structure risk L, the traffic environment risk T, and the natural environment risk N obtained in steps S503 to S505.

A description is now given of examples of risk values that are each set for the road structure, the traffic environment, or the natural environment with reference to FIG. 6. A table of FIG. 6 can be held in the risk calculation unit 205 or the external information obtainment unit 203.

As shown in FIG. 6, each item of the road structure, the traffic environment, and the natural environment has a preset value. For example, when the external information obtainment unit 203 has detected an oncoming vehicle, the weighted average of the traffic environment risks is calculated from the preset values in consideration of the oncoming vehicle. Note that in a case where the external information obtainment unit 203 determines whether the wipers of the vehicle 1 are currently in operation, the calculation may be performed using 0.5 and 2.0 when the operation speed of the wipers is INT and Hi, respectively. That is to say, the same item may have a plurality of values, and may use different values depending on, for example, the positions of traffic participants obtained by the external information obtainment unit 203. In another example, depending on the distance between the vehicle 1 and the oncoming vehicle, for example, 3 (a distance shorter than 5 m), 2 (a distance equal to or longer than 5 m and shorter than 15 m), or 1 (located away by a distance of 15 m or longer) may be set as the risk value of the oncoming vehicle.

Figure 5B:
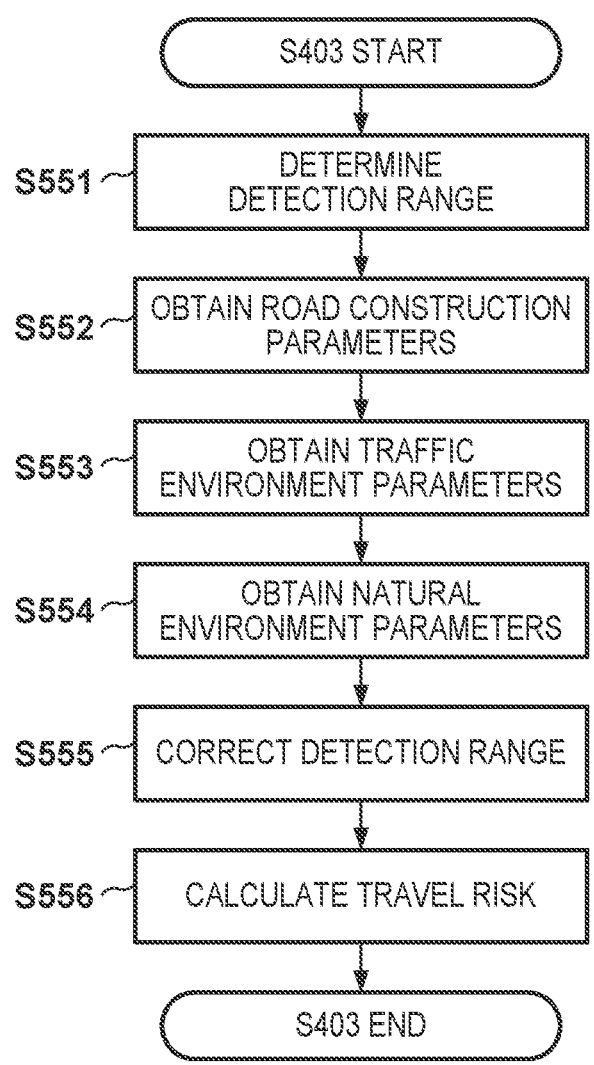

Next, another example of step S403 will be described with reference to FIG. 5B. First, in step S551, the detection range determination unit 202 determines a detection range in a manner similar to step S501. Next, in steps S552 to S554, parameters for correcting the detection range with regard to the road structure, the traffic environment, and the natural environment described in steps S503 to S505 are obtained. The parameters for correcting the detection range may be set in advance similarly to FIG. 6.

Next, the control system 200 corrects the detection range based on the road structure traffic parameters, the traffic environment parameters, and the natural environment parameters. For example, provided that a weighted average of the road structure parameters is L', a weighted average of the traffic environment parameters is T', and a weighted average of the natural environment parameters is N' the corrected detection range VDI' can be yielded as follows.

$$VDI'=VDI-C'$$

$$C'=\text{cbrt}(L' \times T' \times N')$$

Then, in step S556, the travel risk can be calculated as follows based on the corrected detection range.

$$PRP=K(VSP/VDI')$$

The description of FIG. 4 is now resumed. In step S404, the control system 200 determines whether the travel risk calculated in step S403 is smaller than a first threshold. When the travel risk is equal to or larger than the first threshold (No in step S404), the control system 200 proceeds to step S409 in the processing. When the travel risk is smaller than the first threshold (Yes in step S404), the control system 200 proceeds to step S405 in the processing, and determines a target vehicle speed. In determining the target vehicle speed in step S405, for example, a maximum vehicle speed that satisfies acceptable ranges of maximum speeds, maximum rates of acceleration, maximum rates of deceleration, and travel risks may be set as the target vehicle speed. Next, the control system 200 proceeds to step S406 in the processing, and determines whether the travel risk calculated in step S403 is larger than a second threshold. When the travel risk is equal to or smaller than the second threshold (No in step S406, the control system 200 continues traveling at the target vehicle speed (S411), and ends the processing. When the travel risk is larger than the second threshold (Yes in step S406), the control system 200 sets a TOR (Take Over Request, request for delegation of authority) mode as an automated driving mode. In one example, in step S407, the control system 200 may provide a notification that requests a passenger to drive.

Next, the control system 200 proceeds to step S408 in the processing, and determines whether the TOR mode has been in effect for a certain period. Upon determining that the vehicle 1 has been in the TOR mode for the certain period (Yes in step S408), the control system 200 proceeds to step S409 in the processing, stops the vehicle 1, transfers the authority to drive to the passenger in the next step S410, and ends the processing. Note that processing of steps S409 and S410 may be omitted when the vehicle 1 is not in an AD mode of automated driving level 3.

Next, the relationships between traveling speeds and travel risk values (PRP) will be described with reference to FIG. 7.

Figure 7:
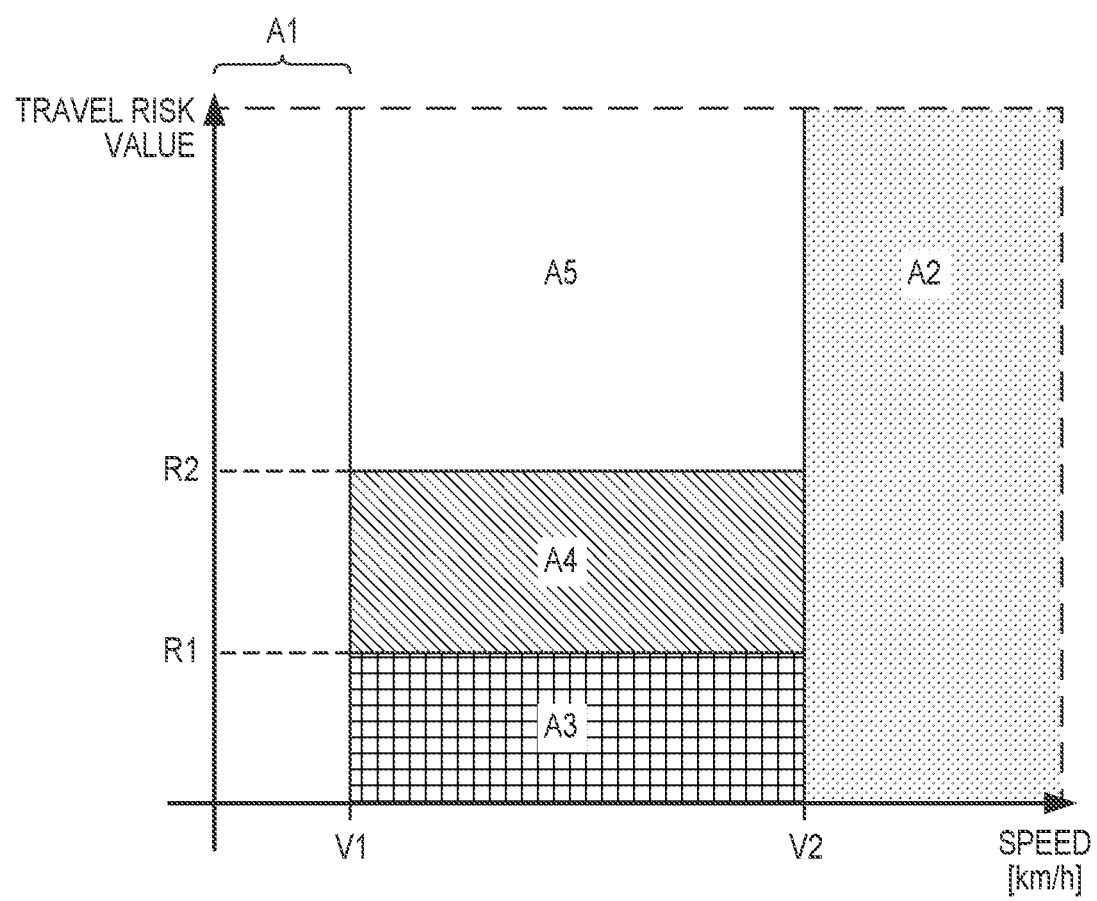
FIG. 7 is a graph showing the relationships among travel risks, speeds, and driving modes according to the present embodiment.

A graph of FIG. 7 includes a region A1 in which the speed is lower than V1, and a region A2 in which the speed is equal to or higher than V2. Furthermore, the graph of FIG. 7 includes a region A3 in which the speed is equal to or higher than V1 and lower than V2 and the travel risk value is smaller than R1, a region A4 in which the speed is equal to or higher than V1 and lower than V2 and the travel risk value is equal to or larger than R1 and smaller than R2, and a region A5 in which the speed is equal to or higher than V1 and lower than V2 and the travel risk value is equal to or larger than R2.

The regions A1 and A5 are authority delegation regions (TD: Traditional Demand), which are regions in which, because the traveling speed is too low or the travel risk is too high, automated driving is not performed, and processing for immediately delegating the authority to drive to the passenger is performed. When in a TD region, the control system 200 requests the passenger to drive manually at once. The region A2 is a region in which only manual driving is permitted. The region A3 is a region in which, because the travel risk is sufficiently low, traveling at automated driving level 3 is possible. The region A4 is a region in which, although the travel risk is high, it is not necessary to immediately switch to manual driving, and thus a transition is made to the TOR (Take Over Request) mode and a request for delegation of authority is issued. In the TOR mode, the control system 200 requests the passenger to start manual driving within a time limit that is longer than a time limit in the regions A1 and A5.

As described above, the control system according to the present embodiment controls a travel state based on map information obtained via the map information obtainment unit and external information detected via the external information detection unit. In this way, a technique to travel with appropriate evaluation of a travel risk of a travel route can be provided.

Other Embodiments

Figure 8:
FIG. 8 is a diagram showing one example of a detection range of the vehicle according to the present embodiment.

The present embodiment has been described using an example that determines a travel risk for a case where a detection range is reduced due to, for example, a corner. In one example, a detection range can be similarly reduced also when the road 301 has rising surfaces and falling surfaces. Therefore, the travel risk may be determined based on a detection range located between rising/falling surfaces. For example, in a case where the vehicle 1 travels on an uphill and a subsequent downhill as shown in FIG. 8, only up to a point 801 is visible from the vehicle 1, even if the road is not narrow. Therefore, the travel risk can be determined by determining a distance from the vehicle 1 to the point 801 as a detection range.

The present embodiment has been described under the assumption that a detection range is a distance that can be detected by the external information obtainment unit 203. In one example, a detection range may be information related to an angle that can be detected by the external information obtainment unit 203. For example, a detection range may be the percentage of an angle that can be detected in a predetermined distance ahead of the vehicle 1 in an angle of a maximum detection range of the external information obtainment unit 203 in the predetermined distance.

Summary of Embodiment

1. A control system (e.g., the control system 200) of a vehicle (e.g., the vehicle 1) according to the above-described embodiment, the vehicle including a detection unit (e.g., the external information obtainment unit 203) for detecting external information related to an outside of surroundings of the vehicle, the external information being used to control a driven state of the vehicle, performs a method comprising: obtaining, by a specification unit (e.g., the map information obtainment unit 201, the detection range determination unit 202) map information of surroundings of a route on which the vehicle travels based on position information of the vehicle, and specifying, from among pieces of detection range information corresponding to the map information, detection range information corresponding to the detection unit; and controlling, by a control unit (e.g., the vehicle speed determination unit 206, the automated driving mode control unit 207), the driven state of the vehicle based on the specified detection range information and the external information.

This makes it possible to provide a technique to travel with appropriate evaluation of a travel risk of a travel route based on the map information corresponding to a range that is detectable by the detection unit.

2. In the control system according to the above-described embodiment, the detection range information includes information corresponding to a distance that is detectable by the detection unit.

This makes it possible to provide a technique to travel with appropriate evaluation of a travel risk of a travel route based on the map information corresponding to the distance that is detectable by the detection unit.

3. In the control system according to the above-described embodiment, the detection unit includes at least one sensor (e.g., detection unit 41 to 43) selected from the group including a camera, a millimeter wave radar, a centimeter wave radar, and LIDAR.

In this way, a technique to travel with appropriate evaluation of a travel risk of a travel route can be provided.

4. In the control system of the above-described embodiment, the map information includes detection range information corresponding to a type of the at least one sensor, and the specifying of the detection range information includes specifying the detection range information based on the type of the at least one sensor.

This makes it possible to provide a technique to travel with appropriate evaluation of a travel risk of a travel route based on the map information including information related to a detection range corresponding to the type of the detection unit.

5. In the control system according to the above-described embodiment, the map information includes detection range information corresponding to types of a plurality of sensors.

This makes it possible to provide a technique to travel with appropriate evaluation of a travel risk of a travel route on a vehicle-by-vehicle basis, even in a case where the type of a sensor included in the detection unit varies with each vehicle.

6. In the control system according to the above-described embodiment, the controlling the driven state of the vehicle includes: calculating a travel risk on the route on which the vehicle travels from the specified detection range information, correcting the travel risk based on the external information, and controlling the driven state of the vehicle based on the corrected travel risk.

In this way, the travel risk that serves as a base is calculated based on the map information corresponding to a detection range of the detection unit, and the travel risk is corrected based on information detected by outside detection unit; as a result, the travel risk can be evaluated more appropriately.

7. In the control system according to the above-described embodiment, the controlling the driven state of the vehicle includes: correcting the specified detection range information based on the external information, calculating a travel risk based on the corrected detection range information, and controlling the driven state of the vehicle based on the travel risk.

In this way, a detection range that serves as a base is calculated based on the map information corresponding to a detection range of the detection unit, and the detection range is corrected based on information detected by outside detection unit; as a result, the travel risk can be evaluated more appropriately.

8. In the control system according to the above-described embodiment, the external information includes information regarding a moving direction of the vehicle, and the map information includes detection range information corresponding to a position and the moving direction of the vehicle.

In this way, a detection range of the detection unit can be obtained in line with the moving direction of the vehicle, and the travel risk can be evaluated more appropriately.

9. In the control system according to the above-described embodiment, the external information includes information related to a road structure.

In this way, the travel risk can be evaluated more appropriately based on a detection range corresponding to the map information and the information related to the road structure.

10. In the control system according to the above-described embodiment, the external information includes information related to a traffic participant that includes at least one of an oncoming vehicle, a vehicle that is traveling alongside, a bicycle, a pedestrian, and a parked vehicle.

In this way, the travel risk can be evaluated more appropriately based on a detection range corresponding to the map information and the information related to the traffic participant.

11. In the control system according to the above-described embodiment, the external information includes information related to a natural environment that includes at least one of a status in which the surroundings of the vehicle have at least one of rainy weather, cloudy weather, fog, snowfall, and yellow sand, a status in which an airborne substance attributed to strong wind has been detected, a status in which a light source exists in front of a camera installed in the vehicle or ahead in a traveling direction of the vehicle, and a status in which there is a shortage of a light amount.

In this way, the travel risk can be evaluated more appropriately based on a detection range corresponding to the map information and the information related to the natural environment.

12. In the control system according to the above-described embodiment, the map information includes pieces of detection range information that respectively correspond to types of weather, and the specifying of the detection range information specification includes specifying detection range information corresponding to the natural environment detected by the detection unit.

In this way, the travel risk can be evaluated more appropriately based on a detection range corresponding to the map information and the information related to the natural environment.

13. In the control system according to the above-described embodiment, the controlling the driven state of the vehicle includes controlling at least one of a target speed of the vehicle and an automated driving level of the vehicle.

This makes it possible to travel the route based on the travel risk in accordance with at least one of an appropriate target speed and automated driving mode.

14. A control method for a control system according to the above-described embodiment is a control method for a control system of a vehicle including a detection unit for detecting external information related to an outside of surroundings of the vehicle, the external information being used to control a driven state of the vehicle, the control method including: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

This makes it possible to provide a technique to travel with appropriate evaluation of a travel risk of a travel route based on the map information corresponding to a range that is detectable by the detection unit.

15. A vehicle according to the above-described embodiment, including a detection unit for detecting external information related to an outside of surroundings of the vehicle, the external information being used to control a driven state of the vehicle, the vehicle performs a control method, performs a control method including: obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

This makes it possible to provide a technique to travel with appropriate evaluation of a travel risk of a travel route based on the map information corresponding to a range that is detectable by the detection unit.

16. A program according to the above-described embodiment causes a computer to execute the following, the computer being included in a control system of a vehicle including a detection unit that detects external information related to an outside of surroundings of the vehicle, the external information being used to control a driven state of the vehicle; obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information.

This makes it possible to provide a technique to travel with appropriate evaluation of a travel risk of a travel route based on the map information corresponding to a range that is detectable by the detection unit.

The invention is not limited to the foregoing embodiments, and various variations/changes are possible within the spirit of the invention.

What is claimed is:

1. A control system of a vehicle, the vehicle including a detection unit for detecting external information related to an outside of surroundings of the vehicle, the external information being used to control a driven state of the vehicle, the control system performs a method comprising:
   obtaining map information of surroundings of a route on which the vehicle travels based on position information of the vehicle, and specifying, from among pieces of detection range information corresponding to the map information, detection range information corresponding to the detection unit; and
   controlling the driven state of the vehicle based on the specified detection range information and the external information,
   wherein the controlling the driven state of the vehicle includes controlling an automated driving level of the vehicle, and
   wherein the controlling the automated driving level of the vehicle includes:
      calculating a travel risk on the route on which the vehicle travels from the specified detection range information;
      in a case where the travel risk is equal to or larger than a first threshold, requesting a passenger of the vehicle to start manual driving within a first time limit; and
      in a case where the travel risk is smaller than the first threshold and larger than a second threshold, which is smaller than the first threshold, requesting the passenger of the vehicle to start manual driving within a second time limit that is longer than the first time limit.

2. The control system according to claim 1, wherein the detection range information includes information corresponding to a distance that is detectable by the detection unit.

3. The control system according to claim 1, wherein the detection unit includes at least one sensor selected from the group consisting of a camera, a millimeter wave radar, a centimeter wave radar, and LIDAR.

4. The control system according to claim 3, wherein the map information includes detection range information corresponding to a type of the at least one sensor, and the specifying of the detection range information includes specifying the detection range information based on the type of the at least one sensor.

5. The control system according to claim 4, wherein the map information includes detection range information corresponding to types of a plurality of sensors.

6. The control system according to claim 1, wherein the controlling the driven state of the vehicle includes:
   calculating a travel risk on the route on which the vehicle travels from the specified detection range information,
   correcting the travel risk based on the external information, and
   controlling the driven state of the vehicle based on the corrected travel risk.

7. The control system according to claim 1, wherein the controlling the driven state of the vehicle includes:
   correcting the specified detection range information based on the external information,
   calculating a travel risk based on the corrected detection range information, and
   controlling the driven state of the vehicle based on the travel risk.

8. The control system according to claim 1, wherein the external information includes information regarding a moving direction of the vehicle, and the map information includes detection range information corresponding to a position and the moving direction of the vehicle.

9. The control system according to claim 1, wherein the external information includes information related to a road structure.

10. The control system according to claim 1, wherein the external information includes information related to a traffic participant that includes at least one of an oncoming vehicle, a vehicle that is traveling alongside, a bicycle, a pedestrian, and a parked vehicle.

11. The control system according to claim 1, wherein the external information includes information related to a natural environment that includes at least one of a status in which the surroundings of the vehicle have at least one of rainy weather, cloudy weather, fog, snowfall, and yellow sand, a status in which a floating substance attributed to strong wind has been detected, a status in which a light source exists in front of a camera installed in the vehicle or ahead in a traveling direction of the vehicle, and a status in which there is a shortage of a light amount.

12. The control system according to claim 11, wherein the map information includes pieces of detection range information that respectively correspond to types of weather, and the specifying of the detection range information specification includes specifying detection range information corresponding to the natural environment detected by the detection unit.

13. The control system according to claim 1, wherein the controlling the driven state of the vehicle includes controlling a target speed of the vehicle.

14. A control method for a control system of a vehicle including a detection unit for detecting external information related to an outside of surroundings of the vehicle, the external information being used to control a driven state of the vehicle, the control method comprising:
   obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information, wherein the controlling the driven state of the vehicle includes controlling an automated driving level of the vehicle, and wherein the controlling the automated driving level of the vehicle includes:

calculating a travel risk on the route on which the vehicle travels from the specified detection range information;

in a case where the travel risk is equal to or larger than a first threshold, requesting a passenger of the vehicle to start manual driving within a first time limit; and in a case where the travel risk is smaller than the first threshold and larger than a second threshold, which is smaller than the first threshold, requesting the passenger of the vehicle to start manual driving within a second time limit that is longer than the first time limit.

15. A vehicle including a detection unit for detecting external information related to an outside of surroundings of the vehicle, the external information being used to control a driven state of the vehicle, the vehicle performs a control method including:

obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information, wherein the controlling the driven state of the vehicle includes controlling an automated driving level of the vehicle, and wherein the controlling the automated driving level of the vehicle includes:

calculating a travel risk on the route on which the vehicle travels from the specified detection range information;

in a case where the travel risk is equal to or larger than a first threshold, requesting a passenger of the vehicle to start manual driving within a first time limit;

in a case where the travel risk is smaller than the first threshold and larger than a second threshold, which is smaller than the first threshold, requesting the passenger of the vehicle to start manual driving within a second time limit that is longer than the first time limit.

16. A computer-readable storage medium having stored therein a program for causing a computer to execute the following, the computer being included in a control system of a vehicle including a detection unit that detects external information related to an outside of surroundings of the vehicle, the external information being used to control a driven state of the vehicle:

obtaining map information of surroundings of a route on which the vehicle travels based on position information of the vehicle, and specifying, from among pieces of detection range information corresponding to the map information, detection range information corresponding to the detection unit; and controlling the driven state of the vehicle based on the specified detection range information and the external information, wherein the controlling the driven state of the vehicle includes controlling an automated driving level of the vehicle, and wherein the controlling the automated driving level of the vehicle includes:

calculating a travel risk on the route on which the vehicle travels from the specified detection range information;

in a case where the travel risk is equal to or larger than a first threshold, requesting a passenger of the vehicle to start manual driving within a first time limit;

in a case where the travel risk is smaller than the first threshold and larger than a second threshold, which is smaller than the first threshold, requesting the passenger of the vehicle to start manual driving within a second time limit that is longer than the first time limit.

17. The control system according to claim 1, wherein the controlling the automated driving level of the vehicle includes:

in a case where the travel risk is equal to or larger than the first threshold, setting the automated driving level of the vehicle to a Traditional Demand mode;

in a case where the travel risk is smaller than the first threshold and larger than the second threshold, setting the automated driving level of the vehicle to a Take Over Request mode; and in a case where the travel risk is equal to or smaller than the second threshold, setting the automated driving level of the vehicle to an Automated Driving mode.

* * * * *